United States Patent
Yang et al.

(10) Patent No.: US 9,942,145 B2
(45) Date of Patent: Apr. 10, 2018

(54) ATTRIBUTE SET_ID IN BORDER GATEWAY PROTOCOL

(71) Applicant: CISCO TECHNOLOGY, INC., San Jose, CA (US)

(72) Inventors: Yi Yang, Cary, NC (US); Alvaro E. Retana, Raleigh, NC (US); Steven Edward Moore, Apex, NC (US); James L. Ng, Mebane, NC (US); Timothy M. Gage, Angrier, NC (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 14/812,239

(22) Filed: Jul. 29, 2015

(65) Prior Publication Data

US 2017/0026288 A1    Jan. 26, 2017

Related U.S. Application Data

(63) Continuation of application No. 14/804,069, filed on Jul. 20, 2015, now Pat. No. 9,843,498.

(51) Int. Cl.
*H04L 12/741* (2013.01)
*H04L 12/751* (2013.01)
*H04L 12/715* (2013.01)

(52) U.S. Cl.
CPC .......... *H04L 45/745* (2013.01); *H04L 45/02* (2013.01); *H04L 45/04* (2013.01)

(58) Field of Classification Search
CPC .... H04L 61/35; H04L 61/6068; H04L 45/745
(Continued)

(56) References Cited

U.S. PATENT DOCUMENTS

| | | | |
|---|---|---|---|
| 7,558,877 B1 | 7/2009 | Fedyk | |
| 7,571,241 B1 * | 8/2009 | Nalawade | ............... H04L 45/02 709/230 |

(Continued)

FOREIGN PATENT DOCUMENTS

WO    WO2014/110997    7/2014

OTHER PUBLICATIONS

Sharon Goldberg, "Why Is It Taking So Long to Secure Internet Routing," Communications of the ACM, vol. 12 Issue 8, Sep. 11, 2014, 14 pages; http://cacm.acm.org/magazines/2014/10/178781-why-is-it-taking-so-long-to-secure-internet-routing/abstract.*

(Continued)

*Primary Examiner* — Edan Orgad
*Assistant Examiner* — Saumit Shah

(57) ABSTRACT

Present disclosure relates to methods for preparing BGP update messages for transmission and processing received update messages. The methods are based on grouping path attributes common to a plurality of IP address prefixes into respective sets identified with respective set identifiers and, instead of duplicating path attributes in each BGP update message, including a respective identifier referring to a certain set of path attributes provided in an earlier BGP update message when sending subsequent update messages. Grouping of path attributes into individual sets associated with respective identifiers provides significant advantages by enabling re-use of the results of previous processing on both the sending and receiving sides associated with transmission of BGP update messages. In addition, such an approach limits the amount of information transmitted in the control plane because duplicate sets of path attributes may only be transmitted once and merely be referred to in subsequent update messages.

17 Claims, 5 Drawing Sheets

(58) Field of Classification Search
USPC .......................................................... 370/351
See application file for complete search history.

(56) References Cited

U.S. PATENT DOCUMENTS

| | | | | |
|---|---|---|---|---|
| 7,630,392 | B2* | 12/2009 | Raza | ...................... H04L 45/02 370/312 |
| 8,700,801 | B2* | 4/2014 | Medved | .................. H04L 45/02 709/242 |
| 8,924,508 | B1* | 12/2014 | Medved | ............ H04L 29/08072 709/217 |
| 2006/0164995 | A1* | 7/2006 | Djernaes | ................. H04L 45/02 370/238 |
| 2011/0026533 | A1* | 2/2011 | Nalawade | ............... H04L 45/00 370/401 |
| 2014/0082216 | A1 | 3/2014 | Patel et al. | |
| 2015/0085638 | A1 | 3/2015 | Li | |
| 2015/0334000 | A1 | 11/2015 | Zhang | |
| 2016/0014025 | A1* | 1/2016 | Wang | ................... H04L 67/148 370/392 |

OTHER PUBLICATIONS

U.S. Appl. No. 14/804,069, filed Jul. 20, 2015, entitled "Attribute SET_ID in Border Gateway Protocol," Inventors: Yi Yang et al.
Van den Schrieck, et al., "BGP Add-Paths : The Scaling/Performance Tradeoffs," IEEE Journal on Selected Areas In Communications, Oct. 2010, 9 pages; http://www.researchgate.net/profile/Virginie_Van_den_Schrieck/publication/224178016_BGP_Add-Paths_The_ScalingPerformance_Tradeoffs/links/004635 1dbb5c26f0e4000000.pdf.
Sharon Goldberg, "Why Is It Taking So Long to Secure Internet Routing," Communications of the ACM, vol. 12 Issue 8, Sep. 11, 2014, 14 pages; http://cacm.acm.org/magazines/2014/10/178781-why-is-it-taking-so-long-to-secure-internet-routing/abstract.
USPTO Nov. 22, 2016 Non-Final Office Action from U.S. Appl. No. 14/804,069.
EPO Oct. 11, 2016 Extended Search Report and Opinion from European Application Serial No. 16179188.4; 8 pages.
Rekhter, Y., et al., "A Border Gateway Protocol 4 (BGP-4)," Network Working Group RFC 4271, Jan. 2006; 104 pages.
Scudder, J., et al., "Capabilities Advertisement with BGP-4," Network Working Group RFC 5492, Feb. 2009; 7 pages.

* cited by examiner

ATTRIBUTE SET_ID IN BORDER GATEWAY PROTOCOL

RELATED APPLICATION

This application is a continuation (and claims the benefit of priority under 35 U.S.C. § 120) of U.S. application Ser. No. 14/804,069, filed Jul. 20, 2015, entitled "ATTRIBUTE SET_ID IN BORDER GATEWAY PROTOCOL," Inventors Yi Yang, et al. The disclosure of the prior application is considered part of (and is incorporated in its entirety by reference in) the disclosure of this application.

TECHNICAL FIELD

This disclosure relates in general to the field of communications and, more particularly, to methods and systems for sending and receiving route advertisements, e.g. Border Gateway Protocol (BGP) update messages.

BACKGROUND

The Internet may be viewed as a collection of Autonomous Systems, where an "Autonomous System" (AS) typically refers to a set of network elements, such as e.g. routers, switches, and controllers, under a single technical administration. The term "network elements" may refer to network elements which could include not only actual physical devices and systems but also devices and systems implemented entirely in software and/or could also include virtual devices and systems components. An AS may also be considered to include hosts connected to the network. Segregation into different AS's allows defining administrative authorities and routing policies of different organizations.

Each AS is "autonomous" (i.e., relatively independent from the other AS's) in the sense that is runs its own independent routing policies and unique Interior Gateway Protocols (IGPs). Exterior routing protocols were created, the current Internet standard EGP being the Border Gateway Protocol (BGP), to exchange routing information between different AS's, a process often referred to as "route advertisement." For example, the BGP defines an inter-AS routing protocol, where one of the primary functions is to exchange network reachability information (NLRI) using a so-called "BGP speaking system" (also often referred to as a "BGP speaker") by means of sending so-called "update messages."

BGPSEC is a relatively recent extension to the BGP, providing cryptographic assurance to a BGP speaker who receives a valid BGPSEC route advertisement in that the advertised route has the property that every AS on the path of AS's listed in the advertisement has explicitly authorized the advertisement of the route to the subsequent AS in the path. While BGPSEC is a very promising candidate for ensuring path security for BGP route advertisements, deployment of this protocol in practice has been challenging due to the fact that techniques currently used for sending route advertisements and processing the received advertisements, especially validation of the cryptographic assurance included in each BGPSEC update message, are highly resource-intensive. Therefore, a need exists for improved techniques for sending and receiving BGP update messages, in particular those that can be used in BGPSEC.

BRIEF DESCRIPTION OF THE DRAWINGS

To provide a more complete understanding of the present disclosure and features and advantages thereof, reference is made to the following description, taken in conjunction with the accompanying FIGUREs, wherein like reference numerals represent like parts, in which.

DETAILED DESCRIPTION OF EXAMPLE EMBODIMENTS

Overview

Figure 1:
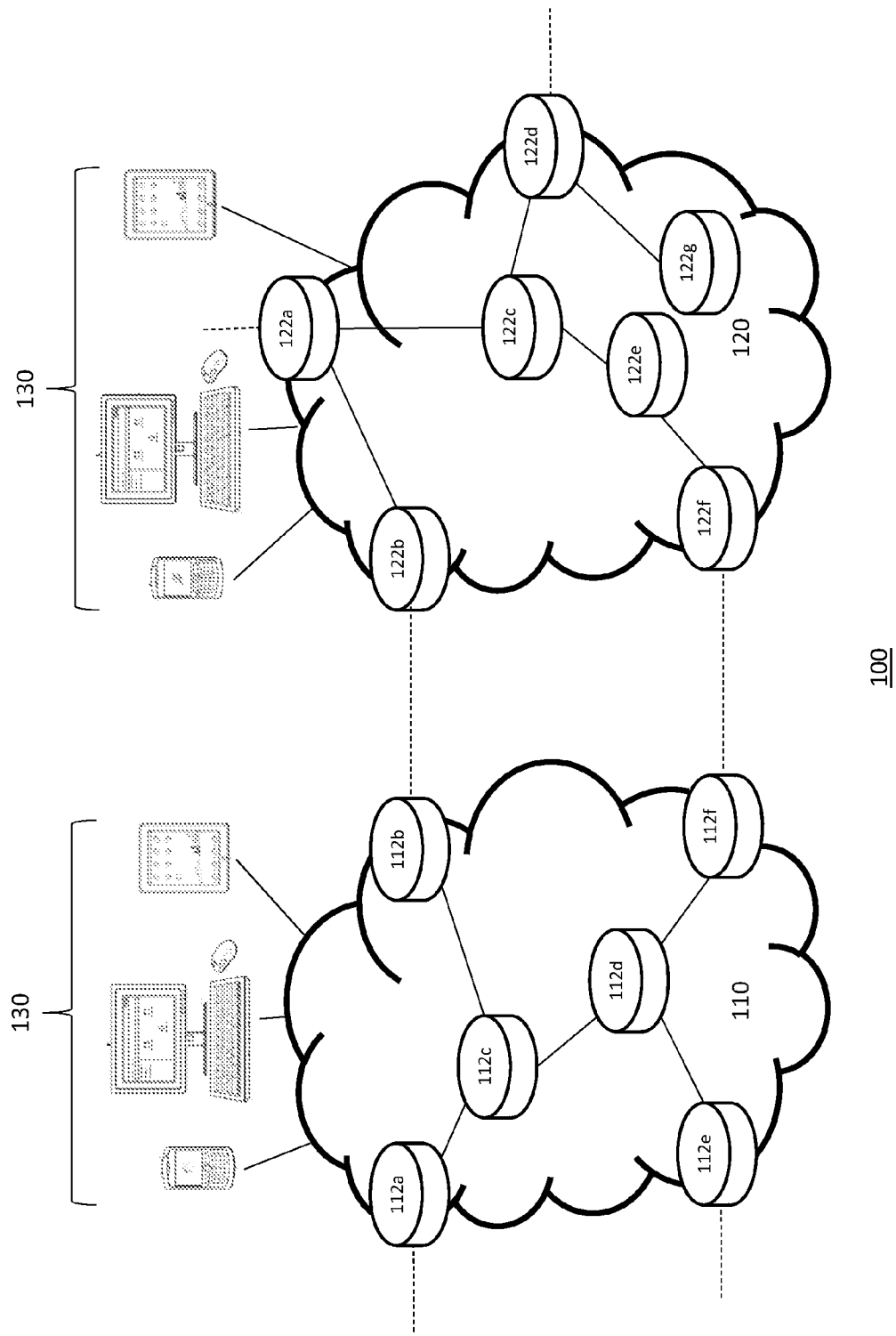
FIG. 1 is a simplified schematic diagram illustrating routing basics within a network comprising multiple AS's, according to some embodiments of the present disclosure.

Some embodiments of the present disclosure operate in the context of BGP, where improved processing of update messages may be ensured by including a new path attribute within BGP update messages, and these embodiments are now described. A skilled person will readily recognize, however, that these teachings are equally applicable to other embodiments and to inter-AS protocols other than eBGP, all of which, therefore, being within the scope of the present disclosure. Further, unless technically not feasible, the BGP and the BGP update messages describe herein may refer, respectively, to BGPSEC and BGPSEC update messages.

In various aspects, embodiments presented herein relate to a computer-implemented method for preparing BGP update messages for transmission and to a computer-implemented method for processing received BGP update messages. The former method is referred to herein as a "sending method" because it relates to processing associated with sending of BGP update messages. The latter method is referred to herein as a "receiving method" because it relates to processing performed upon receipt of BGP update messages.

The sending method includes steps of identifying a first plurality of Internet Protocol (IP) address prefixes associated with a first set of two or more common path attributes (i.e. path attributes that each IP address prefix in the first plurality has in common with all other IP address prefixes), assigning a first identifier to the first set of two or more common path attributes, preparing for transmission a first BGP update message carrying routing advertisement for one or more IP address prefixes of the first plurality of prefixes by including in the first BGP update message the first identifier in addition to the first set of two or more common path attributes, and preparing for transmission a second BGP update message carrying routing advertisement for one or more IP address prefixes of the first plurality of prefixes by including in the second BGP update message the first identifier instead of the first set of two or more common path attributes. The actual
} transmission of the prepared BGP updates messages to other domains may also be included within the sending method.

In an embodiment, the sending method may further include identifying a second plurality of IP address prefixes associated with a second set of two or more common path attributes, assigning a second identifier to the second set of two or more common path attributes, preparing for transmission a third BGP update message by including in the third BGP update message the second identifier in addition to the second set of two or more common path attributes, and preparing for transmission a fourth BGP update message by including in the fourth BGP update message the second identifier instead of the second set of two or more common path attributes. In a further embodiment, the sending method may also include preparing for transmission a fifth BGP update message by including in the fifth BGP update message the first identifier instead of the first set of two or more common path attributes and further including in the first BGP update message the second identifier instead of the second set of two or more common path attributes.

In an embodiment, the sending method may also include maintaining (e.g. generating, storing, and/or updating) a mapping indicating association of identifiers with respective sets of two or more common path attributes. In one further embodiment, the sending method may use such a mapping in response to receiving an indication to prepare a further BGP update message for a further IP address prefix associated with a plurality of path attributes. In such an embodiment, the sending method may include using the mapping to determine whether two or more path attributes of the plurality of path attributes have a corresponding identifier assigned, and, upon positive determination, preparing for transmission a further BGP update message by including in the further BGP update message the corresponding identifier instead of the two or more path attributes of the plurality of path attributes associated with this IP address prefix.

In an embodiment, the sets may be hierarchical in the sense that, if there is more than one match between the two or more path attributes of the plurality of path attributes associated with a particular IP address prefix (i.e. more than two sets match, which sets could possibly be overlapping), then the method may include selecting one set in favor of the other set (or more sets) based on certain criteria.

The receiving method includes steps of receiving a first BGP update message. The first BGP update message may carry routing advertisement for one or more IP address prefixes (e.g. of the first plurality of prefixes described above). The received first BGP update message includes a first identifier in addition to a first set of path attributes and an indication that the first identifier is assigned to the first set of path attributes. The receiving method further includes processing the first BGP update message by at least processing the first set of path attributes included in the first BGP update message and generating a mapping between the first identifier and an outcome of processing the first set of path attributes. Still further, the receiving method includes receiving a second BGP update message comprising the first identifier instead of the first set of path attributes, and using the mapping for the first identifier to access and use the outcome of processing the first set of path attributes in processing the second BGP update message.

In an embodiment, the receiving method may further include steps of receiving a third BGP update message comprising a second identifier in addition to a second set of path attributes and an indication that the second identifier is assigned to the second set of path attributes, processing the third BGP update message by at least processing the second set of path attributes included in the third BGP update message, generating a mapping between the second identifier and an outcome of processing the second set of path attributes, receiving a fourth BGP update message comprising the second identifier instead of the second set of path attributes, and using the mapping for the second identifier to access and use the outcome of processing the second set of path attributes in processing the fourth BGP update message.

In an embodiment, the receiving method may also include receiving a fifth BGP update message comprising the first identifier instead of the first set of path attributes and further comprising the second identifier instead of the second set of path attributes, using the mapping for the first identifier to access and use the outcome of processing the first set of path attributes in processing the fifth BGP update message, and using the mapping for the second identifier to access and use the outcome of processing the second set of path attributes in processing the fifth BGP update message.

In some embodiments of both the sending and receiving methods, first identifier may be included within a Set Identifier (SET_ID) attribute of the first and second BGP update messages, the SET_ID attribute comprising an identifier value field encoding one or more identifiers of respective one or more sets of common path attributes. Such a SET_ID attribute could be implemented as an optional non-transitive attribute of BGP.

Applicable to both the sending and the receiving methods, often, the first and second BGP update messages will include routing advertisement for different IP address prefixes of the first plurality of prefixes. However, it is also possible that the first and second update messages will have one or more IP address prefixes in common.

Also applicable to both the sending and the receiving methods, in various embodiments, both the first and the second BGP update messages may further include other path attributes besides those identified by the first identifier. The other path attributes may be included as individual attributes or be assigned to another identifier in a manner similar to how it is done for the first identifier.

Since embodiments of the methods described herein involve processing of BGP update messages, a functional entity performing embodiments of these methods will be referred to in the following as an "BGP update processing system" (where the word "system" does not imply or limit its implementation to a system). Such a functional entity could be implemented within any network element or distributed among a plurality of network elements associated with AS's, e.g. in BGP speakers of edge routers. For example, a part of the BGP update processing system responsible for preparing BGP update messages for sending may (but does not have to) be implemented separately from a part of the BGP update processing system responsible for processing received BGP update messages. The former part of the BGP update processing system is referred to herein as a "sending BGP update processing system", while the latter part of the BGP update processing system is referred to herein as a "receiving BGP update processing system."

As will be appreciated by one skilled in the art, aspects of the present disclosure, in particular the functionality of the BGP update processing system described herein, may be embodied in various manners. Accordingly, other aspects of the present disclosure relate to systems, computer programs, mechanisms, and means for carrying out the methods according to various embodiments described herein. Such systems, computer programs, mechanisms, and means could be included within various network devices, such as e.g. switches and routers, in particular within edge routers, or BGP speakers (which could be, but do not have to be, included within routers). A computer program may, for example, be downloaded (updated) to the existing network devices and systems (e.g. to the existing routers, switches, various control nodes, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the method according to various embodiments described herein.

In yet another aspect, the present application relates to a data structure for improving processing of routing messages (e.g. update messages), in particular a data structure for use as a Set ID attribute in an inter-AS routing protocol such as e.g. BGP or BGPSEC. In an embodiment, the data structure includes an identifier value field encoding one or more identifiers of respective one or more sets of common path attributes. In an embodiment, such a data structure may be included within BGP update messages, e.g. as an optional non-transitive attribute of BGP update messages described herein.

Example Embodiments

Disclosed are, inter alia, methods, apparatus, data structures, computer-readable medium, mechanisms, and means for sending and receiving BGP update messages, in particular, but not limited to, those that can be used in BGPSEC.

For purposes of illustrating the techniques for sending and receiving BGP update messages described herein, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

Routing Basics

The Internet may be viewed as a collection of Autonomous Systems, where an "Autonomous System" (AS) typically refers to a set of network elements, such as e.g. routers, switches, and controllers, under a single technical administration. An AS may also be considered to include hosts connected to the network. Segregation into different AS's allows defining administrative authorities and routing policies of different organizations.

Within an AS, network elements communicate with one another by routing packets using an interior gateway protocol (IGP) and by referring to certain common metrics. It may also be possible to use several IGPs, such as e.g. Routing Information Protocol (RIP), Enhanced Interior Gateway Routing Protocol (EIGRP), Open Shortest Path First (OSPF) protocol, interior BGP (iBGP) and Intermediate System-to-Intermediate System (IS-IS) protocol, and sometimes several sets of metrics within an AS.

Externally, neighboring AS's communicate with one another by routing packets using an Exterior Gateway Protocol (EGP), the current Internet standard is BGP Version 4 (BGP-4) defined in RFC 4271, which is hereby incorporated by reference.

Each AS is "autonomous" (i.e., relatively independent from the other AS's) in the sense that is runs its own independent routing policies and unique IGPs. The use of the term "autonomous" also stresses the fact that, even when multiple IGPs and metrics are used, the administration of an AS appears to other ASs to have a single coherent interior routing plan and presents a consistent picture of what destinations are reachable through it. Exterior routing protocols were created to exchange routing information between different AS's. For example, the eBGP defines an inter-AS routing protocol, where one of the primary functions is to exchange NLRI by means of BGP speakers sending update messages, described in greater detail below (i.e. NLRI may be viewed as a name of a particular field in a BGP update message, the field encoding one or more IP addresses, also referred to as routes, prefixes, IP address prefixes, or destinations).

FIG. 1 is a simplified schematic diagram illustrating a network environment 100 comprising multiple AS's, according to some embodiments of the present disclosure.

The network environment 100 represents a series of points or nodes of interconnected communication paths for receiving and transmitting packets of information that propagate through the network environment 100. The network environment 100 offers a communicative interface between nodes (e.g., various network elements such as routers 112), and may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration, or any suitable combination thereof that facilitates communications in the network environment 100. Network elements of the network environment 100 can comprise any number of hardware or software elements coupled to (and in communication with) each other through a communications medium. Elements of FIG. 1 may be coupled to one another through one or more interfaces employing any suitable connections (wired or wireless), which provide viable pathways for network communications. Additionally, one or more of these elements may be combined, divided, or removed from the architecture based on particular configuration needs. For ease of illustration, not all elements of FIG. 1 are depicted with communication lines traversing the network environment 100.

In the network environment 100, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node and a destination node via a network. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

In the example of FIG. 1, two AS's are illustrated as a first AS 110 and a second AS 120. The first AS 110 includes routers 112a-112f, each of which may be operatively coupled to at least one other node within the first AS 110 as shown with solid lines between some of the routers 112a-112f. The solid lines between some of the routers 112a-112f may be viewed to represent exchange of packets according to one or more IPGs of the first AS 110, such as e.g. iBGP.

Similarly, the second AS 120 includes routers 122a-122g, each of which may be operatively coupled to at least one other node within the second AS 120 as shown with solid lines between some of the routers 122a-122g. The solid lines between some of the routers 122a-122g may be viewed to represent exchange of packets according to one or more IGPs of the second AS 120, such as e.g. iBGP.

Routers in one AS that are configured to communicate with routers in other AS's are referred to as "edge routers", while routers in one AS that are only configured to communicate with other routes in the same AS are referred to as "core routers." In the illustration of FIG. 1, routers 112a, 112b, 112e, and 112f are edge routers, while routes 112c and 112d are core routers of the first AS 110, while, for the second AS 120, routers 122a, 122b, 122d, and 122f are edge routers and routes 122c, 122e, and 122g are core routers. In FIG. 1, the dashed lines between or extending from some of the edge routers may be viewed to represent exchange of packets according to an EGP, such as e.g. eBGP.

Each of the edge routers is configured to communicate, via e.g. eBGP, with one or more edge routers in another AS. As an illustrative example, the edge routers may be service nodes (e.g. L3VPN, Layer 2 Virtual Private Network (L2VPN) endpoints) that exchange service state via BGP and Label Distribution Protocol (LDP).

A pair of edge routers from different AS's configured to communicate with one another are referred to as "EGP neighbors", e.g. "eBGP neighbors". In the illustration of FIG. 1, one pair of EGP neighbors includes routers 112b and 122b, while another pair of neighbors includes routers 112f and 122f. Other edge routers shown in FIG. 1 may also have their respective EGP neighbors in further AS's, which further AS's are not shown in FIG. 1.

In addition, one or more endpoints may access (or be considered to be included within) at least one of the AS's through various points of attachment (e.g., network access points), shown in the example of FIG. 1 with three endpoints 130 for each AS. The endpoints 130 may e.g. include hosts.

BGP Update Messages

As mentioned above, a BGP speaker is used to exchange NLRI with other BGP systems. The NLRI is exchanged between BGP routers in so-called "update messages" used to send routing updates to peers.

When a BGP session is initialized, update messages are sent until the complete BGP table has been exchanged. Every time an update message is received, the BGP routing table is updated and the BGP route table version is incremented by one. Thus, communicating network elements initially exchange their entire BGP routing table, and then send incremental updates, using update messages.

Besides NLRI, an update message typically also includes path attributes. The NLRI may include one or more routes (i.e. IP address prefixes), as well as multiple path attributes. If a BGP speaker chooses to advertise a route, it may add to or modify the path attributes of the route before advertising it to a peer.

Within an update message, routes are advertised between a pair of BGP speakers with the NLRI comprising a destination field listing, in a form of IP address prefixes, IP addresses of the systems to which the routing information relates. The actual routing information is included in a path attributes field of the same update message by listing path attributes, such as ORIGIN, AS_PATH, etc.

In BGP, path attributes may be categorized into four following categories: 1) well-known, mandatory attributes, 2) well-known discretionary attributes, 3) optional, transitive attributes, and 4) optional, non-transitive attributes.

The path attributes of the first category must appear in every update message and must be supported by all BGP implementations. If such an attribute is missing from an update message, a notification message is sent to a peer. Such attributes include e.g. AS_PATH, ORIGIN, and NEXT_HOP.

The path attributes of the second category may or may not appear in an update message but must be supported by all BGP implementations. Such attributes include e.g. LOCAL_PREF and ATOMIC_AGGREGATE.

The path attributes of the third category may or may not be supported by all BGP implementations. If it is sent in an update message but not recognized by the receiver, it should be passed on to the next AS. Such attributes include e.g. AGGREGATOR and COMMUNITY.

The path attributes of the fourth category may or may not be supported by all BGP implementations and, if received, it is not required that the router passes it on. Such attributes include e.g. MULTI_EXIT_DISC, ORIGINATOR_ID, and CLUSTER_LIST.

Processing Required in Sending and Receiving BGP Update Messages

Typically, the destination field of an NLRI of a BGP update message includes multiple IP address prefixes which share common attributes for their routing information as listed in the path attributes field of that update message. In fact, a big number of IP addresses may share a common set of attributes. However, because of the limited size of a transmission packet, BGP may not be able to encapsulate all of the IP addresses sharing the same set of attributed in a single BGP update message. In such cases, in the current state of the art, multiple update messages are used, with the common path attributes being replicated in each of those individual update messages. Inventors of the present disclosure realized that there are several problems with such an approach.

One problem is related to the processing of BGP update messages on the sending side. Namely, BGP routers have to go through the packetizing process to generate these duplicated path attributes for each update.

Another problem is related to the processing of BGP update messages on the receiving side. Namely, receivers of these BGP update messages have to validate every single duplicated set of path attributes.

Yet another problem is related to the fact that transporting duplicated information wastes control plane bandwidth.

These problems become exacerbated with BGPSEC. As BGPSEC provides a digital signature per each IP address prefix, routing information for multiple IP addresses that may otherwise share a lot of path attributes, will never have the same path attribute BGPSEC_PATH containing the digital signature and, as a consequence, cannot be sent within the same BGP update message. In other words, for BGPSEC, each BGP update message most likely contains routing information for only one IP address prefix, meaning that many more BGP update messages need to be processed on both the sending and the receiving sides and more control plane bandwidth is wasted. In addition, the validation process that needs to be performed in BGPSEC on the receiving side is a computationally intensive process on its own.

Improved Techniques for Sending and Receiving BGP Update Messages

Aspects of the present disclosure aim to improve on the deficiencies of the current state of the art by providing a method for preparing BGP update messages for transmission and a method processing received BGP update messages. The methods are based on grouping path attributes common to a plurality of IP address prefixes into respective sets identified with a respective set identifier and, instead of duplicating path attributes in BGP each update message, including a respective set identifier referring to a certain set of path attributes provided in an earlier BGP update message when sending subsequent update messages. Grouping of path attributes into individual sets associated with respective identifiers provides significant advantages by enabling re-use of the results of previous processing on both the sending and the receiving sides associated with transmission of BGP update messages (which is particularly significant for the receiving side, where validation of the path attributes needs to take place). In addition, such an approach limits the amount of information transmitted in the control plane because duplicate sets of path attributes may only be transmitted once and merely be referred to in subsequent BGP update messages (i.e. they do not have to be re-transmitted each time).

Embodiments described in the present disclosure may be viewed as providing a new BGP extension, in particular a BGP extension to information included in update messages, which allows optimizing sending and receiving of BGP update messages. To that end, a method for preparing BGP update messages to be transmitted by a BGP speaker (i.e., the sending method) and a method for processing BGP update messages received from a BGP speaker (i.e., the receiving method) are disclosed. The sending method, illustrated in FIGS. 4 and 5, may be implemented by a sending BGP update processing system 210 shown in FIG. 2. The receiving method, illustrated in FIG. 6, may be implemented by a receiving BGP update processing system 300 shown in FIG. 3.

Figure 2:
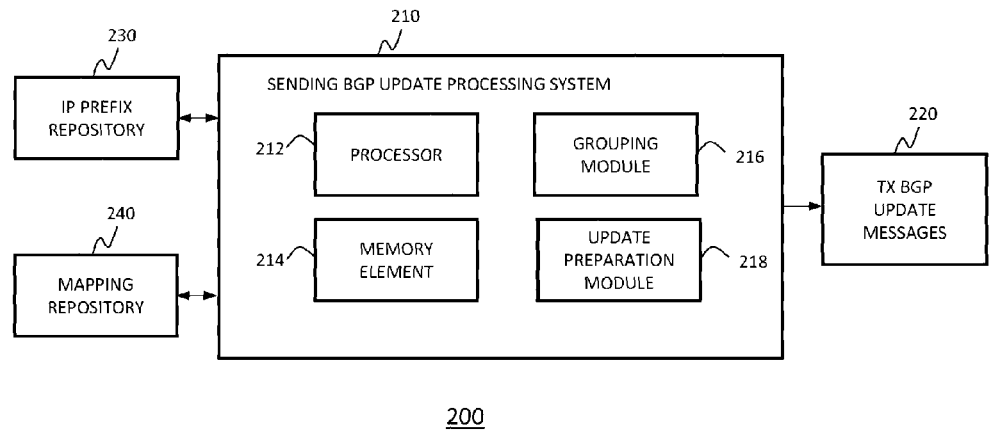
FIG. 2 is a simplified block diagram of an example network environment comprising a sending BGP update processing system for preparing BGP update messages for transmission, according to some embodiments of the present disclosure.

FIG. 2 is a simplified block diagram of an example network environment 200 comprising a sending BGP update processing system 210 for preparing BGP update messages for transmission, according to some embodiments of the present disclosure. In at least one embodiment, the sending BGP update processing system 210 includes at least one processor 212 and at least one memory element 214, along with any other suitable hardware and/or software to enable its intended functionality. The sending BGP update processing system 210 may be considered to include a grouping module 216 configured to carry out functionality described herein related to attribute grouping while preparing BGP update messages. The sending BGP update processing system 210 may further be considered to include an update preparation module 218 configured to carry out functionality described herein related to the preparation (e.g. packaging) of BGP update messages to be transmitted. The sending BGP update processing system 210 may also include an interface (not shown in FIG. 2) to enable communication with other devices, e.g. endpoints 130 illustrated in FIG. 1 or receiving BGP update processing system 310 illustrated in FIG. 3. As a result of performing functionality described herein, the sending BGP update processing system 210 can generate BGP update messages to be transmitted, as shown in FIG. 2 with TX BGP update messages 220. Optionally, in different embodiments, various repositories may be associated with the sending BGP update processing system 210, including, but not limited to, an IP address prefix repository 230 and a mapping repository 240.

Figure 3:
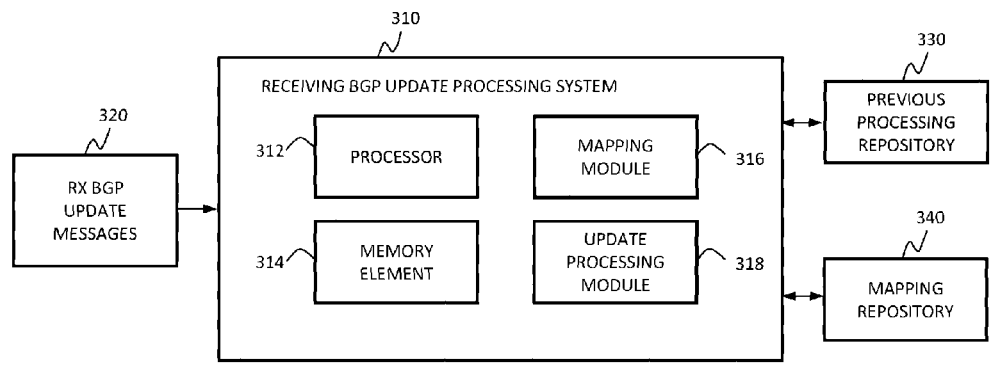
FIG. 3 is a simplified block diagram of an example network environment comprising a receiving BGP update processing system for processing received BGP update messages, according to some embodiments of the present disclosure.

FIG. 3 is a simplified block diagram of an example network environment 300 comprising a receiving BGP update processing system 310 for processing received BGP update messages, according to some embodiments of the present disclosure. As shown in FIG. 3 with RX BGP update messages 320, the receiving BGP update processing system 310 can receive BGP update messages (as e.g. transmitted by, or after the processing by, the sending BGP update processing system 210 shown in FIG. 2) and process them according to functionality described herein. To that end, similar to the sending BGP update processing system 210, in at least one embodiment, the receiving BGP update processing system 310 includes at least one processor 312 and at least one memory element 314, along with any other suitable hardware and/or software to enable its intended functionality. The receiving BGP update processing system 310 may be considered to include a mapping module 316 configured to carry out functionality described herein related to mapping of set identifiers to previous outcomes of processing of sets of path attributes and/or to the sets of path attributes themselves. The receiving BGP update processing system 310 may also be considered to include an update processing module 318 configured to carry out functionality described herein related to processing of the path attributes of the received BGP update messages. The receiving BGP update processing system 310 may also include an interface (not shown in FIG. 3) to enable communication with other devices, e.g. endpoints 130 illustrated in FIG. 1 or sending BGP update processing system 210 illustrated in FIG. 2. Optionally, in different embodiments, various repositories may be associated with the receiving BGP update processing system 310, including, but not limited to, a previous processing results repository 330 and a mapping repository 340.

The BGP update processing systems 210 and/or 310 can communicate with, or be implemented as, one or more network elements in the network environment 100, such as e.g. one or more BGP speakers/edge routers. As used herein, the term 'network element' is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

In one implementation, the BGP update processing systems 210 and/or 310 may include software to achieve (or to foster) processing of BGP update messages as outlined herein. Note that in one example, the BGP update processing systems 210 and 310 can have an internal structure (e.g., processor(s), memory element(s), network interface card(s), etc.) to facilitate some of the operations described herein. In other embodiments, activities related to processing of BGP update messages as outlined herein may be executed externally to the BGP update processing systems 210 and/or 310, or included in some other network element to achieve this intended functionality. Alternatively, the BGP update processing systems 210 and/or 310 may include this software (or reciprocating software) that can coordinate with other network elements in order to achieve the operations, as outlined herein. In still other embodiments, one or several devices may include any suitable algorithms, hardware, software, firmware, components, modules or interfaces that facilitate the operations thereof.

Elements of FIGS. 2 and 3 may be coupled to one another as well as to elements shown in FIG. 1 through one or more interfaces employing any suitable connections (wired or wireless), which provide viable pathways for network communications. Additionally, one or more of these elements may be combined, divided, or removed from the architecture based on particular configuration needs. Network environments 200 and 300 may include a configuration capable of TCP/IP communications for the transmission and/or reception of packets in the network.

The repositories shown in FIGS. 2 and 3 may include physical or logical storage elements, e.g. storage elements with one or more disks or/and databases for storing electronic data. Data in these repositories can be accessed and modified at least by the BGP update processing systems illustrated in FIGS. 2 and 3. In other embodiments, the data can also be accessed by other systems and network elements.

Figure 4:
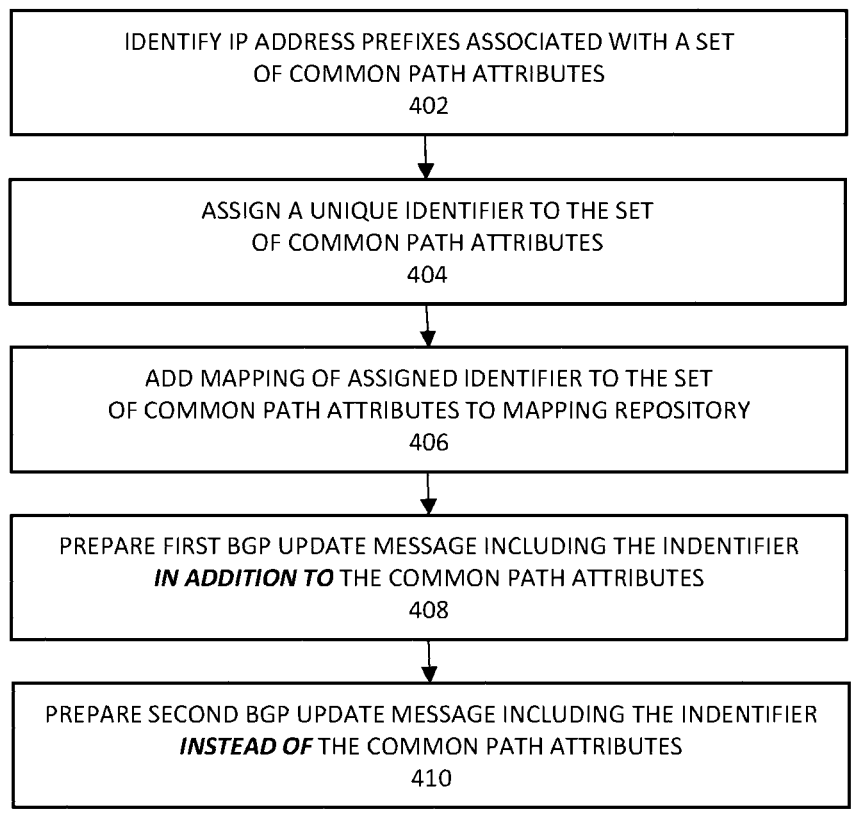
FIG. 4 is a flow diagram of a method for preparing BGP update messages for transmission, according to some embodiments of the present disclosure.

FIG. 4 is a flow diagram of a method for preparing BGP update messages for transmission, according to some embodiments of the present disclosure. Persons skilled in the art will recognize that even though the method 400, as well as methods 500 and 600 illustrated in FIGS. 5 and 6 respectively, are described with reference to the elements of the network environments illustrated in FIGS. 1-3, any systems configured to carry out the steps of any of these methods, in any order, are within the scope of the present disclosure.

The sending method may be considered to begin with step 402, where the sending BGP update processing system 210 (e.g. the grouping module 216), identifies a group of IP address prefixes associated with a set of two or more common path attributes. All or a portion of the IP address prefixes being analyzed may be obtained from the IP address prefix repository 230.

In some embodiments, some or all of these IP address prefixes are associated with further path attributes besides those that are identified as common. For example, consider that IP address prefix IP1 is associated with path attributes A, B, C, D, E, and F while IP address prefix IP2 is associated with path attributes A, B, and C. These two IP address prefixes may be considered to be a group of prefixes that are associated with a set of common attributes, the common attributes being, in this example, attributes A, B, and C.

Continuing with this example, for the purpose of explaining steps illustrated in FIG. 4, consider that the method 400 takes place at a time when a set of path attributes A, B, and C has not been assigned a unique identifier as used herein. In such a case, the method 400 proceeds to step 404, where the sending BGP update processing system 210 (e.g. the grouping module 216) assigns a certain unique identifier to the set of common path attributes identified in step 402 (i.e. to the set of attributes A, B, and C). An identifier assigned to each new set needs to be unique as far as being able to differentiate between the different sets. For example, consider that an identifier ID1 is assigned to the set of path attributes A, B, and C.

In step 406, the sending BGP update processing system 210 (e.g. the grouping module 216) adds a mapping of the set of common path attributes identified in step 402 to the identifier assigned in step 404. Such a mapping may e.g. be stored in the mapping repository 240.

In step 408, the sending BGP update processing system 210 (e.g. the update preparation module 218) prepares for transmission a first BGP update message that would carry routing advertisement for one or more of the IP address prefixes identified in step 402. To that end, the sending BGP update processing system 210 includes in the first update message the set of common path attributes as identified in step 402 as well as the identifier that the sending BGP update processing system 210 assigned to this set of common path attributes in step 404, along with an indication to which path attributes of the update message the identifier refers to. One way of providing such an indication includes e.g. listing the type codes of the path attributes in the set.

Continuing with the example described above, consider that in step 408 a BGP update message for IP1 is prepared. The address IP1 is associated with path attributes A-F, of which, so far in this example, attributes A-C have been assigned to a set identified by the identifier ID1. The BGP update message for IP1 will then include the path attributes A-F, the identifier ID1, and an indication that ID1 is assigned to a set of attributes A-C.

Since IP address prefixes IP1 and IP2 do not completely overlap in their path attributes (i.e. they have different path attributes), their routing information cannot be provided in a single update message. Therefore, routing information for IP2 will be sent in a separate BGP update message, e.g. in the message of step 410.

In step 410, the sending BGP update processing system 210 (e.g. the update preparation module 218) prepares for transmission a second BGP update message that would carry routing advertisement for one or more of the IP address prefixes identified in step 402. This time, the sending BGP update processing system 210 may skip including in the second update message the actual set of common path attributes as identified in step 402 and only provide the identifier that the sending BGP update processing system 210 assigned to this set of common path attributes in step 404.

Continuing with the example described above, since a BGP update message for IP1 was already prepared in step 408, in step 410 a BGP update message for IP2 is prepared. The address IP2 is associated with path attributes A-C, of which, in this example, all are assigned to a set identified by the identifier ID1. The BGP update message for IP2 may then include the identifier ID1 instead of (i.e. without) including the path attributes A-C.

In other examples, a BGP update message may include multiple set identifiers as well as a combination of set identifiers without duplicating the associated path attributes and set identifiers sent along with the associated common path attributes as is done e.g. for the first BGP update message in step 408. For example, consider that another IP address prefix, IP3, is associated with attributes A, B, C, G, H, and I, where attributes A, B, and C have been assigned to set ID1 and attributes G, H, and I have been assigned to set ID2. In such a case, if a BGP update message similar to the one sent in step 406 was transmitted for the attributes G-I, then a BGP update message carrying routing advertisement for IP3 may include set identifiers ID1 and ID2 instead of attributes A-I. Otherwise (i.e., if attributes G-I have just been assigned to the set ID2 and the receiving BGP update processing system 310 still needs to be informed of the assignment), a BGP update message carrying routing advertisement for IP3 may include the set identifier ID1 instead of attributes A-C and the set identifier ID2 in addition to the attributes G, H, and I.

In an embodiment, the sending BGP update processing system 210 preparing BGP update messages for transmission may act as a trigger to transmit the messages once they are prepared.

Configuring the receiving BGP update processing system 310 to be able to interpret such update messages correctly yields optimization in terms of computational, network, and storage resources. In an embodiment, the identifier of a set could be included in a BGP update message in a new path attribute, referred to herein as a SET_ID attribute. In an embodiment, the length and attribute value will be variable as it will depend on which one or more set identifiers need to be included in a particular BGP update message. The SET_ID attribute could be included within a BGP update message as one of the optional non-transitive attributes described above. Providing the identifier in this manner ensures that the receiving BGP update processing system 310 will be able to identify all of the path attributes for the one or more IP address prefixes identified in an update message. In addition, in an embodiment, a BGP speaker supporting the SET-ID attribute (i.e. a system such as the sending BGP update processing system 210) may be configured to use Capability Advertisement procedure(s), such as e.g. Capabilities Advertisement described in BGP-4, RFC 5492, to determine whether the speaker is able to send and/or receive the SET-ID attribute. In an embodiment, such a capability does not require more information beyond confirming support, and, therefore, may be advertised with using capability code and capability length zero.

As a skilled person would recognize, a BGP capability code indicates what capabilities a BGP peer supports. In an embodiment, such a support could be indicated by including a capability code for the SET_ID attribute described herein. The capability code itself would indicate support for the SET_ID attribute described herein, so no associated value needs to be provided, allowing for the capability length (indicating how large the value would be) being set to zero.

In an embodiment, the length of SET_ID attribute (e.g. 4 bytes or octets) and attribute value (i.e. one or more set ID values encoded) will be variable as it will depend on which one or more set identifiers need to be included in a particular BGP update message. Such an attribute SET_ID may be used when multiple update messages, sharing a common set of path attributes, are sent.

While BGP update messages are described as "first" and "second" and method steps related to their generation are illustrated in a sequence from first to second, any order of preparation and even actual transmission of such BGP update messages is within the scope of the present disclosure. As long as at least one of the BGP update messages includes not only the set identifier but the actual path elements of the set to which the identifier is assigned (along with the indication of their correspondence), all other BGP update messages for IP address prefixes associated with the path elements of such a set may be sent including only the set identifier but not the actual path attributes of the set.

Furthermore, it should be noted that, even though the techniques described herein are described in terms of not including common path attributes in some BGP update messages (i.e. update messages that include set identifiers instead), as long as those path attributes were included in at least one other update message, in some embodiments, it may be advantageous to still include the common path attributes in other BGP update messages, along with set identifiers, e.g. for redundancy and verification reasons. While such embodiments would not result in decrease in control plane traffic caused by the BGP update messages, they would still provide advantages compared to current state of the art in terms of being able to re-use processing results for the common sets of path attributes on sending and/or receiving sides.

Still further, in some embodiments, a single BGP update message may contain a set identifier that is both defined and referenced within. For example, the identifier may point to a set of attributes that later repeat themselves. In this case, in an embodiment, the receiving BGP update processing system could be configured to process any new identifiers and store the outcome of processing the first group of attributes in the appropriate storage before processing any references to it.

In an embodiment, the sending BGP update processing system 210 may be configured to maintain (e.g. generate, store, and/or update) the mapping repository 240 containing association of identifiers with respective sets of two or more common path attributes. In such a mapping, there is one-to-one correspondence between the identifiers and the sets of attributes, where each identifier is assigned to one set and vice versa.

Figure 5:
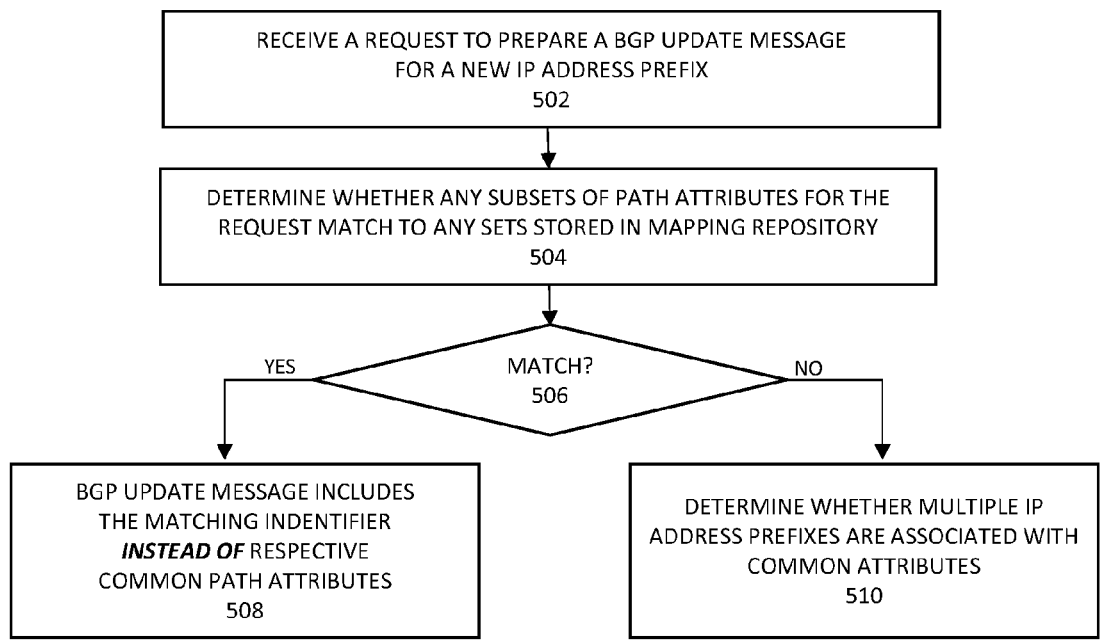
FIG. 5 is a flow diagram of a further method for preparing BGP update messages for transmission, according to some embodiments of the present disclosure.

In an embodiment, the sending BGP update processing system 210 may be configured to dynamically update the mapping repository 240 as new sets are created and BGP update messages are prepared and transmitted as was described with reference to FIG. 4. In such an embodiment, however, it may be desirable to do an extra check upon receiving a request to send routing advertisement for a new IP address prefix (or a plurality of new IP address prefixes). Such an extra check is illustrated in FIG. 5 depicting a flow diagram of a further method 500 for preparing BGP update messages for transmission, according to some embodiments of the present disclosure.

In step 502, the sending BGP update processing system 210 (e.g. the grouping module 216) receives a new request to transmit routing advertisement for a new IP address prefix (i.e. to prepare a further BGP update message). In response to the request, in step 504, the sending BGP update processing system 210 (e.g. the grouping module 216) is configured to perform a search, e.g. a similarity search, to determine whether any two or more path attributes associated with the new IP address match any of the sets already created as e.g. stored in the mapping repository 240. In one embodiment, such a search may include the comparison of the ordered set of attribute types included in a set, followed by the verification of the contents. Alternatively or additionally, a pattern search algorithm could be used, such as e.g. Knuth-Morris-Pratt (KMP) algorithm. In an embodiment, the mapping repository could be organized to optimize the implementations of a particular search methodology (or multiple methodologies).

In step 506, the sending BGP update processing system 210 determines whether the search of step 504 revealed any matches.

If more than one match is identified, then the sending BGP update processing system 210 may be configured to select one match based on some predefined criteria (e.g. select the set that covers the largest number of common path attributes, or select the set that has the greatest processing associated with it e.g. upon receipt of a BGP update message). For example, consider that a new IP address prefix is associated with path attributes A, B, C, D, E, and F and the mapping repository contains reference to one set comprising path attributes A, B, and C (e.g. set ID1) and another set comprising path attributes A, B, C, D, and E (e.g. set ID2). The sending BGP update processing system 210 may then be configured to select set ID2 because it maps to larger number of path attributes.

In an embodiment, the sets that have already been created may include an indication about the hierarchy of the sets. Such an implementation may be particularly useful if, as a part of determination whether or not there is a match (step 506), two or more path attributes happen to match to more than one set. In such embodiments, the sending BGP update processing system 210 may be configured to select one match based on the hierarchical order of the sets as indicated e.g. in the mapping repository 240. For example, consider that a new IP address prefix is associated with path attributes A, B, C, D, E, and F and the mapping repository contains reference to one set comprising path attributes A, B, and C (e.g. set ID1) and another set comprising path attributes A, B, and E (e.g. set ID2). The sending BGP update processing system 210 may then be configured to select set ID1 because it is indicated to be higher in order of hierarchy than set ID2 (e.g. because processing of path attributes of set ID1 is more computationally intensive, so it's preferable to be able to re-use the outcome of that re-processing).

Once one or more matching sets are selected, the method proceeds to step 508, where the sending BGP update processing system 210 (e.g. the update preparation module 218) prepares for transmission a BGP update message that would carry routing advertisement for the new IP address prefix identified in step 502. This time, similar to step 410 described above, the sending BGP update processing system 210 may skip including in this BGP update message the actual set of common path attributes as identified by the match of step 506 and only provide the identifier for the matching set as obtained from the mapping repository 240.

If no match is identified in step 506, then the sending BGP update processing system 210 may be configured to go ahead and prepare a BGP update message carrying routing information only for the new IP address prefix of step 502 (not shown in FIG. 5). Alternatively, as shown with step 510 in FIG. 5, the sending BGP update processing system 210 may be configured to determine whether there are any other IP address prefixes that have common path attributes associated with the new IP address prefix of step 502. If so, then the method may proceed to the method 400 illustrated in FIG. 4, where a new set is created and added to the mapping repository 240.

Figure 6:
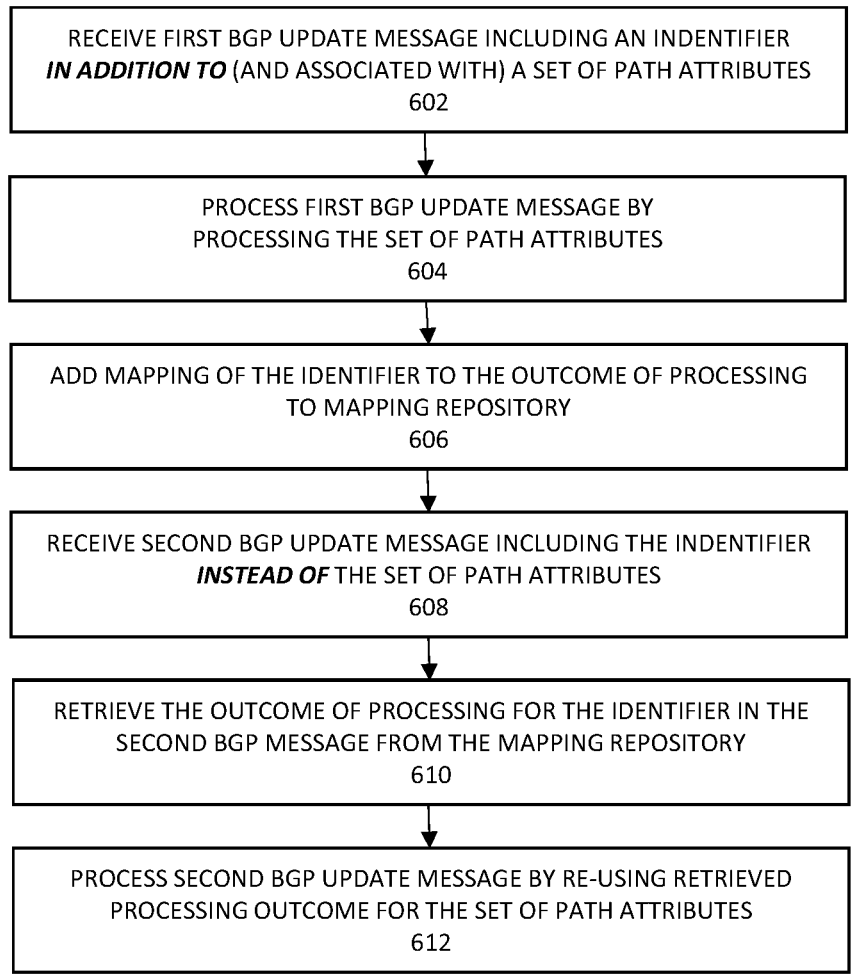
FIG. 6 is a flow diagram of a method for processing received BGP update messages, according to some embodiments of the present disclosure.

FIG. 6 is a flow diagram of a method 600 for processing received BGP update messages, according to some embodiments of the present disclosure. The method 600 complements the methods for preparing and sending BGP updates messages described above in that it relates to processing of these BGP update messages on the receiving side. Therefore, this method is explained with reference to the example with IP1 and IP2 described above and first and second BGP messages sent for those IP address prefixes.

The method 600 may begin with step 602, where the receiving BGP update processing system 310 (e.g. the mapping module 316) receives the first BGP update message described above (the one prepared in step 408). Because this message does not include any sets of common path attributes that have been processed by the receiving BGP update processing system 310 before (as described above, set identifier ID1 is provided in the first BGP update message for the first time), the receiving BGP update processing system 310 (e.g. the update processing module 318) then proceeds to process the first BGP message by processing the path attributes as known in the art (step 604). However, this time, the receiving BGP update processing system 310 is configured to isolate the outcome of processing of the set of path attributes for which a set identifier was included in the first update message. For the example described above, the receiving BGP update processing system 310 identifies and isolates the processing outcome for attributes A, B, and C assigned to the set identifier ID1. The receiving BGP update processing system 310 (e.g. the mapping module) is then configured to store the outcome of processing of such a set of attributes, e.g. in the mapping repository 340 and/or the previous processing repository 330, by mapping the outcome of processing to the corresponding set identifier. In an embodiment, the receiving BGP update processing system 310 may be configured to keep such mappings in the mapping repository 340 and/or the previous processing repository 330 even if related NLRIs are removed, e.g. until the session is down/reset.

A person skilled in the art will recognize that what exactly is involved in "processing" of a set of path attributes is often largely implementation-specific. In an embodiment, processing of a set of path attributes may include that, at a minimum, a system copies the path attribute(s) into memory from the incoming packet (packet deconstruction), delivery of the payload to the TCP stack for the BGP Application, which then must do this processing. In an embodiment, processing may involve means manipulation of the attribute flags and type codes, triggering respective protocol specific responses. Since the path attribute sets described herein can be of variable length, the more complex the network the more likely the attribute sets will increase in complexity as well. In an embodiment, processing of a set of path attributes may include e.g. verifying the total length of the attributes enclosed. Additionally or alternatively, for each attribute, processing could include validating the type code and verifying the type code against a set of attribute flags. Further, processing could include verifying specific length and/or value of each attribute as to whether the length and/or value are appropriate and valid in the context of the update.

In step 608, the receiving BGP update processing system 310 receives the second BGP update message described above (the one prepared in step 410). The receiving BGP update processing system 310 will identify that the second BGP update message contains a set identifier for a set that was processed before (e.g. by consulting the mapping repository 340) and will be able to retrieve (e.g. from the previous processing repository 330) the outcome of the earlier processing for the set identified by the identifier included in the second BGP update message (step 610). In step 612, the receiving BGP update processing system 310 (e.g. the update processing module 318) processes the second BGP update message by re-using the retrieved processing outcome performed for the first BGP update message. In other words, path attributes A-C do not have to be re-processed again for the IP address prefixes identified in the second BGP update message. Instead, result (either partial or the entire result) of their processing performed for the first BGP update message may be re-used.

BGP update messages containing more than one set identifiers, and/or a combination of set identifiers and actual path attributes will be processed similarly.

BGPSEC Implementation

As described above, embodiments described herein with reference to BGP and BGP update messages are equally applicable to BGPSEC and BGPSEC update messages. While a skilled person would readily recognize adaptions which may be necessary to implement teachings described herein in the context of BGPSEC, some non-limiting implementation possibilities are provided below.

In an embodiment, a local keys repository required for BGPSEC may be available for both the sending and receiving BGP update processing systems 210 and 310. Such a repository could contain local cryptographic keys used for signing the BGP updates as well as global keys used to validate the received signatures. In an embodiment, instead of or in addition to storing at least some of these keys, seed data (e.g. one or more seed values) used to generate the keys may be stored.

In an embodiment, the BGP update processing systems 210 and/or 310 may include software and/or hardware to enable the cryptographic signing and resolving of the BGPSEC-specific attributes. As an example, the sending processing system may be configured to create a Signature_Block to be the included in the BGPSEC Path Attribute. The receiving processing system may be configured to verify the validity of the signatures.

In an embodiment, preparation of the BGP updates as described e.g. with reference to FIG. 4, may include considering IP prefixes associated with a common set of attributes while ignoring the BGPSEC Path Attribute. In some implementations, it may be necessary to replace the AS_PATH attribute with the BGPSEC Path Attribute, which results in also ignoring the AS_PATH attribute when searching for a common set of attributes.

In an embodiment, the receiving BGP update processing system 310 receiving a BGPSEC update (as related to 600), may be configured to only accept the routing information if the BGPSEC Path Attribute is valid. However, the receiving BGP update processing system 310 may be configured to consider the previous processing result for a SET_ID included in the update, as it may save expensive cryptographic processing.

Other Routing Protocols

In certain implementations, the techniques described here may apply to other routing protocols. For example, IS-IS (Intermediate Systems to Intermediate System) is an IGP, which distributes routing information inside an AS. IS-IS uses Link State Packets (LSP) to describe the state of the links inside the AS. Each LSP contains information about a node in the network and its interfaces, which may include descriptions and capabilities of each. Because multiple links on a node may share a similar description and/or capabilities, the LSP may carry some redundant information in the form of Type Length Value (TLV) attributes. It is common for these TLV attributes to repeat themselves inside a given LSP.

All of the teachings provided herein for BGP/BGPSEC are equally applicable to other routing protocols, such as e.g. IS-IS. While a skilled person would readily recognize adaptions which may be necessary to implement teachings described herein in the context of other routing protocols, some non-limiting implementation possibilities related to IS-IS are provided below.

In some embodiments, the repeating TLV attributes may be grouped to form a set, as described herein for grouping BGP path attributes in a set.

In some embodiments, the result of similar link descriptions and/or capabilities would then result in the sets of TLV attributes repeating themselves inside an LSP.

The mechanisms described above may be used to both describe and reference a single set, or multiple sets, inside a single LSP.

In this type of implementation, the receiver could be configured to first process the SET-ID attributes that describe the set and store the result, before processing the SET-IDs that reference the set; i.e. that are included in the LSP instead of the TLV attributes themselves.

Variations and Implementations

In certain example implementations, functions related to processing of BGP update messages as described herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the functionality related to processing of BGP update messages as described herein. Additionally, each of these devices may include a processor that can execute software or an algorithm to perform the anomaly evaluation functionality as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of the processing of BGP update messages, as potentially applied to a myriad of other architectures.

It is also important to note that the steps in the FIGS. 4-6 illustrate only some of the possible scenarios that may be executed by, or within, the BGP update processing system(s) described herein. Some of these steps may be deleted or removed where appropriate, or these steps may be modified or changed considerably without departing from the scope of the present disclosure. In addition, a number of these operations have been described as being executed consecutively, concurrently with, or in parallel to, one or more additional operations. However, the timing of these operations may be altered considerably. The preceding operational flows have been offered for purposes of example and discussion. Substantial flexibility is provided by the BGP update processing system(s) in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method for preparing Border Gateway Protocol (BGP) update messages for transmission, the method comprising:
   assigning a first identifier to a first set of path attributes;
   assigning a second identifier to a second set of path attributes;
   preparing one or more first BGP update messages by including in the one or more first BGP update messages the first identifier in addition to the first set of path attributes and including the second identifier in addition to the second set of path attributes; and
   preparing a second BGP update message by including in the second BGP update message the first identifier instead of the first set of path attributes and the second identifier instead of the second set of path attributes.

2. The method according to claim 1, further comprising:
   maintaining a mapping indicating association of identifiers with respective sets of two or more common path attributes.

3. The method according to claim 2, further comprising:
   in response to receiving an indication to prepare a further BGP update message for a further IP address prefix associated with a plurality of path attributes, using the mapping to determine whether two or more path attributes of the plurality of path attributes have a corresponding identifier assigned; and
   upon positive determination, preparing a further BGP update message by including in the further BGP update message the corresponding identifier instead of the two or more path attributes of the plurality of path attributes.

4. The method according to claim 1, wherein the first identifier is included within a Set Identifier (Set ID) attribute, the Set ID attribute comprising an identifier value field encoding one or more identifiers of respective one or more sets of common path attributes.

5. The method according to claim 4, wherein the Set ID attribute is an optional non-transitive attribute of BGP.

6. The method according to claim 1, wherein the first set of path attributes includes path attributes common to a first plurality of Internet Protocol (IP) address prefixes, and the second set of path attributes includes path attributes common to a second plurality of IP address prefixes.

7. A system for preparing Border Gateway Protocol (BGP) update messages for transmission, the system comprising:
   at least one memory configured to store computer executable instructions, and
   at least one processor coupled to the at least one memory and configured, when executing the instructions, to:
   assign a first identifier to a first set of path attributes;
   assign a second identifier to a second set of path attributes;
   prepare one or more first BGP update messages by including in the one or more first BGP update messages the first identifier in addition to the first set of path attributes and including the second identifier in addition to the second set of path attributes; and
   prepare a second BGP update message by including in the second BGP update message the first identifier instead of the first set of path attributes and the second identifier instead of the second set of path attributes.

8. The system according to claim 7, wherein the at least one processor is further configured to:
   maintain a mapping indicating association of identifiers with respective sets of two or more common path attributes.

9. The system according to claim 8, wherein the at least one processor is further configured to:
   in response to receiving an indication to prepare a further BGP update message for a further IP address prefix associated with a plurality of path attributes, use the mapping to determine whether two or more path attributes of the plurality of path attributes have a corresponding identifier assigned; and
   upon positive determination, prepare a further BGP update message by including in the further BGP update message the corresponding identifier instead of the two or more path attributes of the plurality of path attributes.

10. The system according to claim 7, wherein the first identifier is included within a Set Identifier (Set ID) attribute, the Set ID attribute comprising an identifier value field encoding one or more identifiers of respective one or more sets of common path attributes.

11. The system according to claim 10, wherein the Set ID attribute is an optional non-transitive attribute of BGP.

12. The system according to claim 7, wherein the BGP update messages comprise BGPSEC update messages.

13. The system according to claim 7, wherein the first set of path attributes includes path attributes common to a first plurality of Internet Protocol (IP) address prefixes, and the second set of path attributes includes path attributes common to a second plurality of IP address prefixes.

14. One or more non-transitory computer readable storage media encoded with software comprising computer executable instructions for preparing Border Gateway Protocol (BGP) update messages for transmission and, when the software is executed, operable to:
- assign a first identifier to a first set of path attributes;
- assign a second identifier to a second set of path attributes;
- prepare one or more first BGP update messages by including in the one or more first BGP update messages the first identifier in addition to the first set of path attributes and including the second identifier in addition to the second set of path attributes; and
- prepare a second BGP update message by including in the second BGP update message the first identifier instead of the first set of path attributes and the second identifier instead of the second set of path attributes.

15. The one or more non-transitory computer readable media according to claim 14, wherein the computer executable instructions are further operable to:
- maintain a mapping indicating association of identifiers with respective sets of two or more common path attributes.

16. The one or more non-transitory computer readable media according to claim 15, wherein the computer executable instructions are further operable to:
- in response to receiving an indication to prepare a further BGP update message for a further IP address prefix associated with a plurality of path attributes, use the mapping to determine whether two or more path attributes of the plurality of path attributes have a corresponding identifier assigned; and
- upon positive determination, prepare a further BGP update message by including in the further BGP update message the corresponding identifier instead of the two or more path attributes of the plurality of path attributes.

17. The one or more non-transitory computer readable media according to claim 14, wherein the first set of path attributes includes path attributes common to a first plurality of Internet Protocol (IP) address prefixes, and the second set of path attributes includes path attributes common to a second plurality of IP address prefixes.

* * * * *